United States Patent [19]

Peer

[11] Patent Number: 4,567,570
[45] Date of Patent: Jan. 28, 1986

[54] ELECTRONIC CONTROL SYSTEM FOR A LINEARLY SLANTED PRINT HEAD

[75] Inventor: Thomas R. Peer, New Milford, Conn.

[73] Assignee: Exxon Research and Engineering Co., Florham Park, N.J.

[21] Appl. No.: 467,040

[22] Filed: Feb. 16, 1983

[51] Int. Cl.[4] .............................................. G06F 3/12
[52] U.S. Cl. .................................... 364/900; 364/519; 101/93.04; 101/93.23; 400/61; 400/70
[58] Field of Search ... 364/200 MS File, 900 MS File, 364/519; 101/93.05, 93.04, 93.23; 400/70, 121, 124

[56] References Cited

U.S. PATENT DOCUMENTS

| | | | |
|---|---|---|---|
| 4,059,183 | 11/1977 | Hoskins | 197/1 R |
| 4,091,390 | 5/1978 | Smith et al. | 346/75 |
| 4,273,040 | 6/1981 | Sebrosky et al. | 101/93.04 |
| 4,279,199 | 7/1981 | Blanco et al. | 101/93.05 |
| 4,364,060 | 12/1982 | Jinnai et al. | 346/75 |
| 4,408,907 | 10/1983 | Bernadis | 400/124 |

FOREIGN PATENT DOCUMENTS 2128140  4/1984  United Kingdom ............ 400/62

OTHER PUBLICATIONS

K. L. Konnerth et al., *Realtime Rotation & Mirror Transformation of Square Images*, IBM Tech. Disclos. Bull. (vol. 27, No. 1B Jun. 1984), pp. 831–834.

J. M. Dunn et al., *Enhanced Foreign Language Character Set*, IBM Tech. Disclos. Bull (vol. 22, No. 7, Dec. 1979), pp. 2638–2640.

B. R. Cavill, *End Condition Correction Scheme for Slanted Print Heads*, IBM Tech. Disclos. Bull. (vol. 23, No. 5, Oct. 1980), pp. 1762–1763.

S. F. Kambic, *Rotated Matrix Characters/Graphics System*, IBM Tech. Discl. Bull. (vol. 22, No. 11, Apr. 1980), pp. 4988–4990.

Primary Examiner—James D. Thomas
Assistant Examiner—A. E. Williams, Jr.
Attorney, Agent, or Firm—Kenneth Watov

[57] ABSTRACT

A logic network and method for processing columns of vertically oriented imaging data bits to produce control signals for operating a linearly slanted print head, includes writing different equal byte segments of each such column into a RAM memory while pre-skewing successive bytes, respectively, from one another by the equivalent of the number of columns of print resolution capability between successive print elements of the print head represented by each byte. Thereafter, skewing of the imaging data bits is completed during readout from memory, by fetching in columnar order the bits required for operating the print elements to print the image data under the print head during a given print cycle.

18 Claims, 10 Drawing Figures

ELECTRONIC CONTROL SYSTEM FOR A LINEARLY SLANTED PRINT HEAD

FIELD OF THE INVENTION

The field of the present invention relates generally to matrix printers, and more particularly to matrix printers including a print head having print elements arranged on a slant relative to a horizontal plane.

DESCRIPTION OF THE RELATED ART

Many matrix printers, such as wire matrix printers, pin printers, thermal printers, and ink jet printers, for example, include print heads having the print elements aligned vertically. Such vertical alignment of the print elements imposes a limitation upon the element-to-element spacing permissable for printing at some desired printing resolution. It has been determined that by slanting the print elements of the matrix print head, the printing resolution can be optimized, while permitting an element-to-element spacing considerably larger than would be allowable using a noninclined or vertically aligned print elements in the print head. In addition, a slanted or inclined print head provides flexibility in design in permitting a number of alternative implementation of actuators for the print elements, in view of removing the constraint of "small dimensions" in the element-to-element spacing of the print elements.

In U.S. Pat. No. 4,059,183, for "Dot Matrix Printer With Slanted Print Head and Modular Skewing of Dot Pattern Information", assigned to IBM Corporation, and issued on Nov. 22, 1977, a matrix printer incorporating a slanted print head is disclosed. The IBM printer includes a print head that spans and prints three character lines of data initially loaded into a print line buffer at the beginning of printing every three lines of print. Characters to be printed are divided into eight dot modules, each representing one-eighth of a character dot pattern. The dot patterns in the modules are skewed by a circuit including a ten-bit triangular shift register, and two memories for each one of the 24 dot pattern modules are required for a character column having three characters with eight modules per character. The print elements of the print head are slanted by 45°, wherein the print elements extend across ten dot rows and ten dot columns simultaneously. Accordingly, the triangular shift circuit requires ten shift registers of from one to ten bits, whereby the first nine bytes and the last nine bytes of dot data for a dot pattern module that passed through the shift circuit contain only partial data and are stored in different ones of the memory stores for the dot pattern module. As indicated in the IBM patent, "the initial and final data portions are combined with final and initial partial data portions for corresponding modules for preceding and subsequent characters respectively so as to present full-dot pattern data to the print head in the proper order."

In U.S. Pat. No. 4,091,390, for "Arrangement for Multi-Orifice Ink Jet Print Head", a print head incorporating a slanted or inclined array of ink jets is shown. This second patent is also assigned to IBM Corporation, and issued on May 23, 1978.

SUMMARY OF THE INVENTION

The present inventor recognized that the matrix printer systems available for driving a print head consisting of slanted or inclined print elements were very complex, requiring a high component count and complicated data handling. Accordingly, he designed the present inventive data converter system for driving a slanted print head of a matrix printer with a system having a low component count via the use of a microprocessor and a short processing time via unconventional microprocessor-memory-I/O (Input/Output) design and implementation.

Included in the present invention are input latch means for receiving individual vertical columns of imaging input data bits that is operable for dividing each column into byte column segments, equal in number to the number of banks of memory means. The input latch means and memory means are operable for writing into each bank of memory the segments of each column of imaging input data bits, respectively, in a manner skewing each successive segment from the other by the equivalent of the number of columns of print capability of the printer analogous to the horizontal resolution available between the print elements associated with the data bits of each one of the equal length segments of imaging input bits. In this manner, preskewing of each vertical column of imaging input data bits is accomplished. Output latch means and the memory means are operable during a given print cycle for assembling the control signals required for operating the print elements to print out the imaging data under the head at that time by successively reading out data bytes from appropriate addresses. For the first appropriate memory address accessed, the first or top bits of each one of the column segments of data bits making up the data bit column at that memory address are loaded into the output latch means for providing the control signals for operating the first or lead group of print elements of the print head equal in number to the number of banks of memory available. The second memory address access is at a memory location decremented from the first memory address by the number of columns of memory equivalent to the horizontal resolution of the printer between two adjacent print elements, for one direction of movement of the print head. At this second memory address, the second bits from the top of each one of the column segments making up the column of imaging data bits at that address are loaded into the output latch means immediately after the previously loaded bits for obtaining the control signals for operating the print elements of the next portion of the print head. This process of addressing the memory means for loading the output latch means is continued in an iterative manner for the third through last bits of the appropriate column segments, respectively, until all of the required control signals have been loaded into the output latch means. For each such assembly of control signals, the number of different columns of memory addressed are equal to the number of print elements on the print head divided by the number of memory banks. In this manner, the data bits finally assembled for providing the control signals for each print cycle are completely skewed via the previously described method of preskewing when writing the bits into memory, and finally skewing the bits via the read out process from memory to the output latch means. Much greater detail for the apparatus and method of the present invention follows.

BRIEF DESCRIPTION OF THE DRAWING

In the drawings, wherein like elements are indicated by the same reference number:

FIG. 7 is a detailed logic/circuit schematic diagram of one embodiment of the present invention;

DESCRIPTION OF THE PREFERRED EMBODIMENTS

Figure 1:
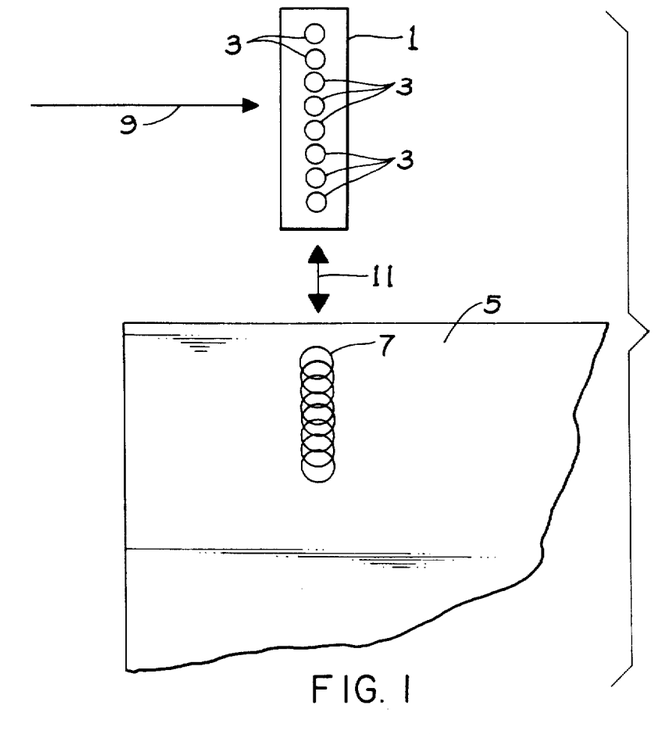
FIG. 1 shows the typical operation of a print head having vertically aligned print elements for printing a vertical column upon a print medium.

In FIG. 1, a print head 1 for a conventional matrix printer, such as an ink jet or wire matrix printer, for example, includes individual print elements or jets 3 that are aligned vertically, thereby enabling parallel processing of imaging data. Accordingly, imaging input data bits from a data processor, for example, can in a typical matrix printer system be latched or saved until a time when position signals are received, at which time the saved information or data bits can be synchronously applied to the imaging power drivers operating the print elements. Such operation would continue on a column by column basis throughout the print line, with each vertical column of data being printed upon a print medium 5, such as paper, new column data latched, then printed, and so forth. Such a sequence of printing can readily be provided using common parallel 8-bit microprocessors, logic, and memories.

Figure 2:
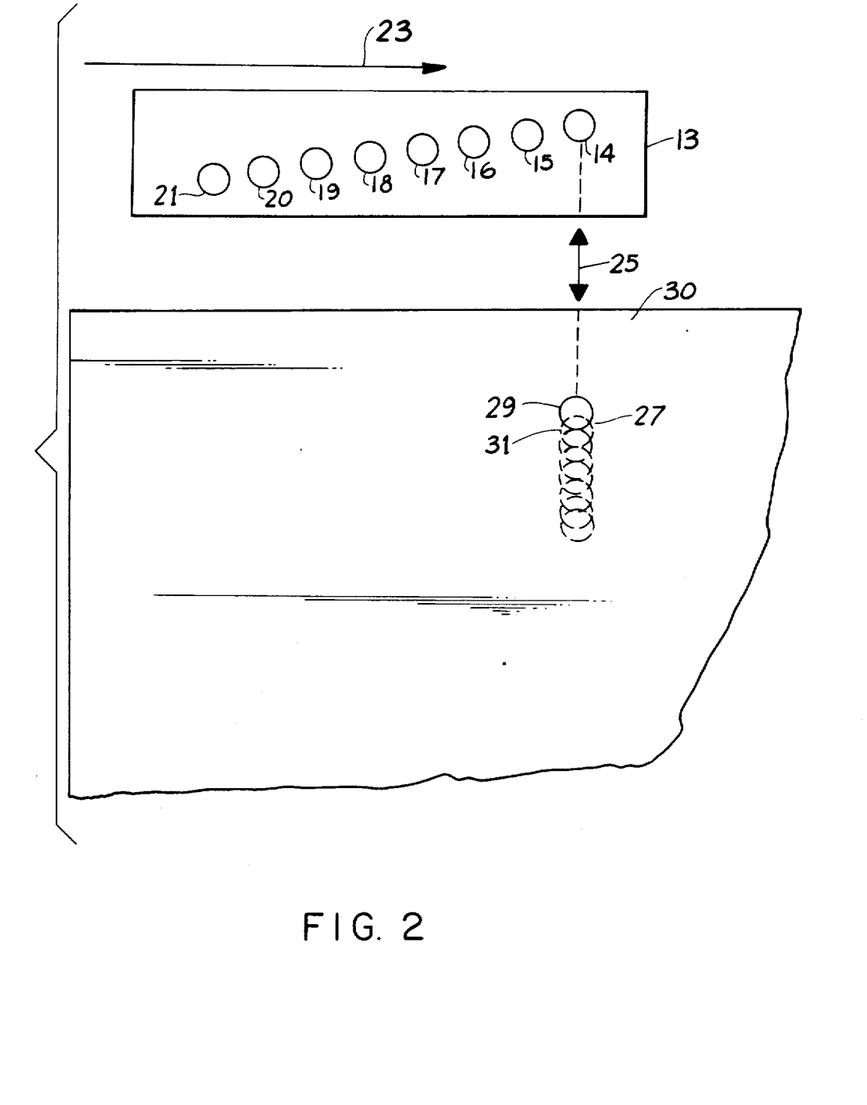
FIG. 2 shows the typical operation of a print head having print elements linearly arranged on a slant for printing a vertical line on a print medium.

To illustrate the imaging problems associated with a print head having a slanted array of print elements, it is helpful to first describe the example of printing a single vertical line 7, eight dots high, via the vertical in-line element print head 1, followed with an example of printing a vertical line with a slanted element print head B (See FIG. 2). Using print head 1, the vertical line 7 is printed by firing or operating all eight of the print elements 3 in response to a column position reference signal provided by the printer electronics (not shown). In this manner, each dot portion making up the vertical line 7 is printed at the same time, thereby completing the vertical line. Note that in this example the print head 1 is moving in the direction of arrow 9, and that the column reference position is indicated by the double arrow 11. Such printing of a vertical line cannot be accomplished in a single print cycle when using a print head 13, as shown in FIG. 2, having print elements 14 through 21 arranged on a slant, as shown, for example.

With reference to FIG. 2, assume that the slanted print head 13 is moving in the direction of the arrow 23, and that the column reference position is as indicated by the double arrow 25. In this example, printing of the vertical column 27 upon print medium 30 is initiated when the print head 13 moves to a position where print element 14 is at column position 25, whereupon a print drive signal will be outputted by the printer electronics for causing operation of print element 14, the lead print element 14 of the print head 13 relative to the direction of movement 23. Operation of print element 14 will cause the top dot 29 portion of dot column 27 to be printed upon the print medium 30, as shown, in this example. The horizontal resolution of a typical matrix printer system is usually designated in columns or dots per inch. Accordingly, when print head 13 moves the number of columns in the horizontal necessary for bringing print element 15 to column position 25, this event will be detected by the printer electronics for causing print element 15 to be activated for printing the next occurring dot 31 of vertical line 27 upon the print medium 30. In a similar manner, the vertical line 27 will be completely printed via print head 13 moving the distance necessary for passing the remaining print elements 16 through 21 past the column position 25, and firing or operating each print element at each respective such time of passing. From this example, it has been shown that the imaging information or data for a single vertical line, in fact as well as for every other column in the line of print being produced, must be metered out throughout the traverse distance and time from the first to the last print element of the particular slanted print head, head 13 in this example.

In printing with a slanted print head such as head 13, it has been shown that only one print element at a time can be positioned at any unique column, thereby requiring single dot (bit as opposed to byte) manipulation. Such data manipulation becomes a serious problem when implemented with parallel oriented logic devices. When bit manipulation is handled by a classical microprocessor design, the penalty paid is the time required to sequentially process the bits. When bit manipulation is implemented in hardware alone, the penalty paid is the number of components required. As will be described, the present invention overcomes these problems.

Figure 3:
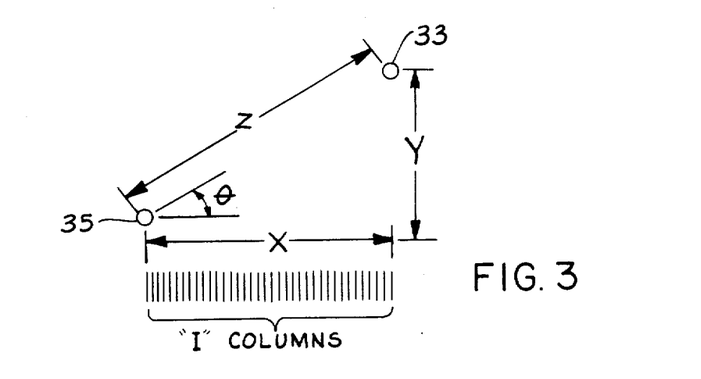
FIG. 3 shows the orientation between two print elements of a slanted print head.

Before proceeding, it may be helpful to define certain parameters. With reference to FIG. 3, two print elements 33, 35 of a typical slanted print head are shown (assume that the print head has more than two print elements linearly arranged on a slant, that is equidistant from one another), the distance Z representing the distance between elements 33, 35. With respect to the horizontal plane, the elements are slanted at an angle $\theta$, as shown. The horizontal projection of the distance Z between the orifices 33, 35 is shown as X, whereby:

$$X = Z \cosine \theta \tag{1}$$

$$Y = Z \sine \theta \tag{2}$$

where Y is the vertical resolution for the slanted print head. The horizontal interval I for the matrix printer is given by:

$$I = XH \tag{3}$$

where I must be an integer, if digital processing is used, and represents the number of print columns between print elements, and H typically is the chosen horizontal resolution in the matrix printer in columns per inch. Since a column is representative of a vertical line, H can also be given in units of vertical lines per inch, if desired. There is no restraint other than the physical limitations of the matrix printer system on the horizontal resolution chosen for a particular matrix printer system.

Figure 4:
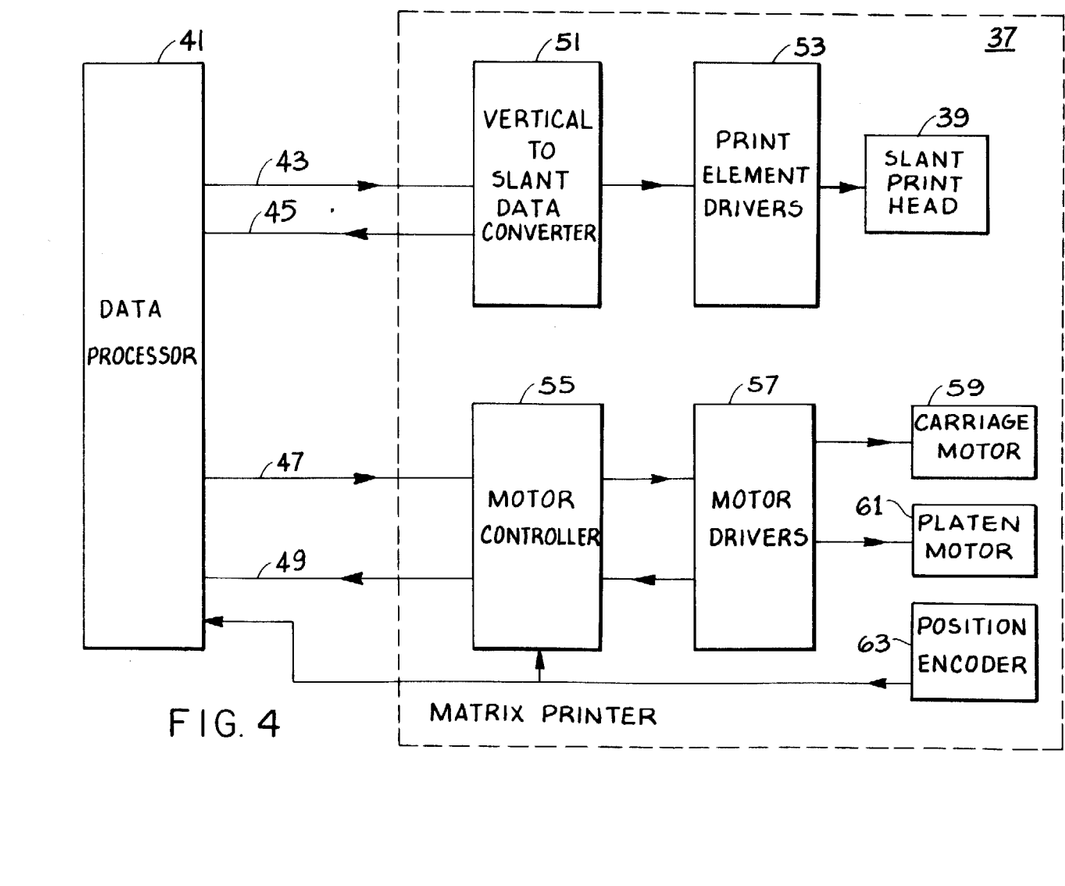
FIG. 4 is a block diagram of one embodiment of the matrix printer system of the present invention.

In FIG. 4, a typical matrix printer system 37 is shown in a block diagram, and includes in this example a slant printer head 39. Also in this example, a data processor 41 is shown as the host machine supplying columns of vertically oriented imaging data bits to the printer 37 for printing out a desired image on a print medium. The imaging data bits are supplied to printer 37 over a data bus 43, and control signal buses 45, 47, and 49 are used for passing control signals between the matrix printer 37 and the data processor 41. Also included in the matrix printer 37 are a vertical-to-slant data converter 51 for converting the received vertically oriented imaging data bits into control signals for operating the print element drivers 53 for controlling the slanted print head to print the imaging data upon the print medium in the same vertical orientation of the originally received imaging data bits, or in italics, if desired. Also, a motor controller 55, partially controlled by data processor 41, provides control signals for operating motor drivers 57 in controlling the operation of a carriage motor 59 for moving the print head 39, and a platen motor 61 for moving the print medium placed upon the platen of the printer to a desired position for initiating a new line of print. A position encoder 63 detects the column position of the print head 39 at any given time and outputs a signal representative thereof to the motor controller 55, and data processor 41. Other matrix printer designs may be used in a matrix printer including a slanted print head than the one shown in FIG. 4, and also the host machine may be other than a data processor 41. The present invention is primarily concerned with the vertical-to-slant data converter 51, which will be subsequently described in much greater detail.

Figure 5:
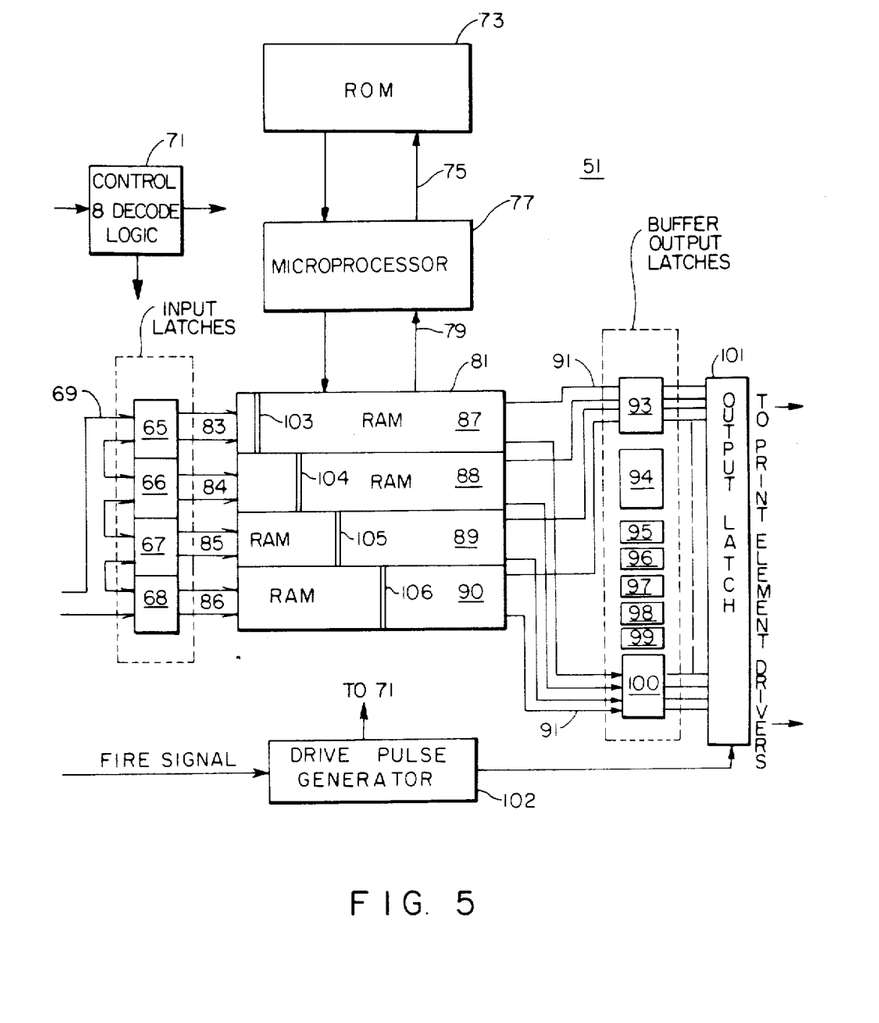
FIG. 5 is a block/schematic diagram of one embodiment of the present invention.

In FIG. 5, a block schematic diagram is shown of one embodiment of the present invention. The main elements of the vertical-to-slant data converter 51 include four eight-bit input latches 65 through 68, an input data bus 69, control and decode logic 71, a read-only-memory (ROM) 73 connected via an address and data bus 75 to a microprocessor 77, an address bus 79 for connecting the microprocessor 77 to a random access memory (RAM) 81, data buses 83 through 86 for connecting the input latches 65 through 68, respectively, to the memory banks 87 through 90, respectively, of the random access memory (RAM) 81. The RAM 81 is connected via output lines to eight output latches 93 through 100, and tri-state latches 101. Also included is a drive pulse generator 102. In general, the RAM 81 can include more or less than four banks of memory, with the number of input latches typically being equal to the number of banks of memory in the RAM 81, and the number of output latches typically equal to the number of print elements of the slanted print head 39 divided by the number of available banks of memory in the RAM 81.

Figure 6:
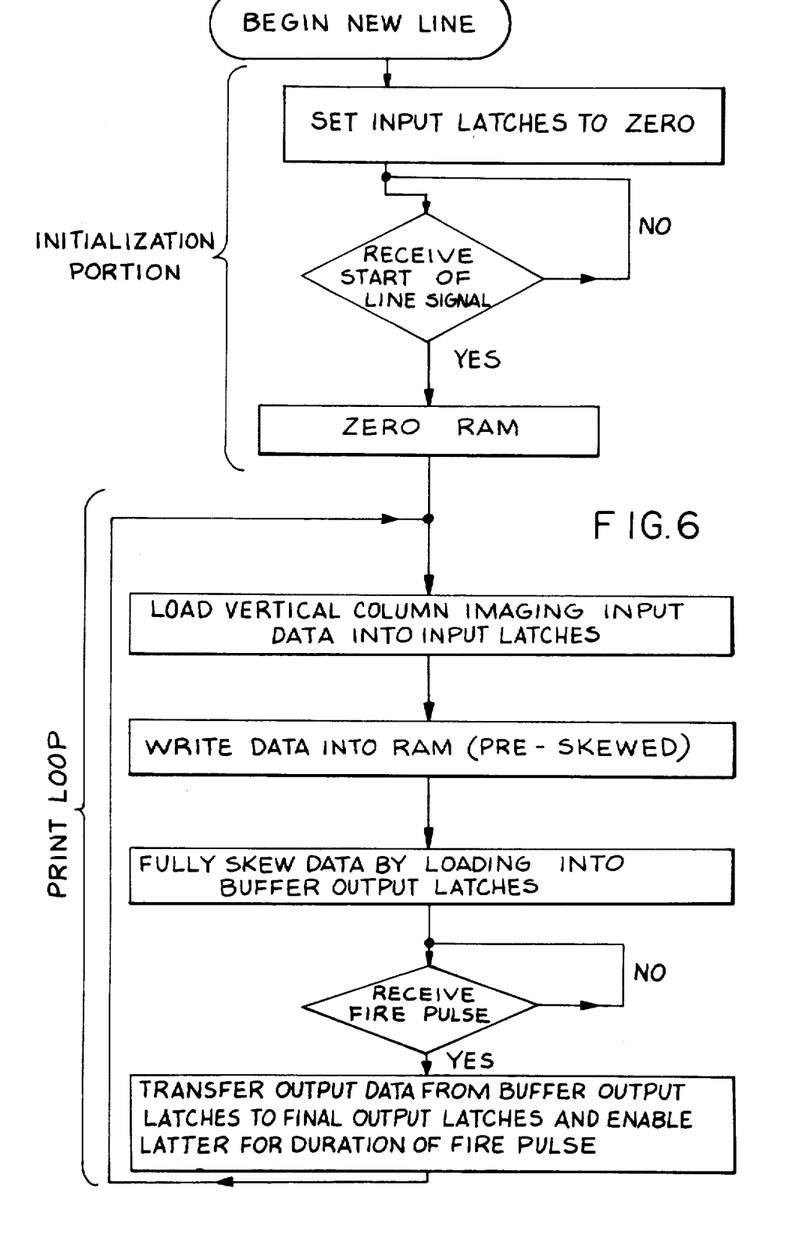
FIG. 6 is a flow chart showing the program control for one embodiment of the present invention.

With further reference to FIG. 5, the previous example given above for FIG. 2 related to the use of eight print elements 14–21 for the slanted print head 13, whereas the following illustrative example will refer to 32 print elements or dot producers. As will be shown, the discussion can be extrapolated to any number of print elements within practical limits. With reference to FIG. 6, the microprocessor 77 sequences through the control program contained in the read-only memory (ROM) 73. Assume that for each memory address of RAM 81 that a column of at least 32 bits of memory is located thereunder, respectively. Further assume that the top most bit is related to the first or leading print element of the slanted print head 39, and that the next succeeding bits taken in order from the top are related to the 2nd through 32nd print elements of the print head 39. The general sequence for the program shown in flow chart form in FIG. 6 is initiated externally at the beginning of a print line. At this time, the direction in which line is to be printed, left-to-right or right-to-left, is passed to the microprocessor 77. Subsequently, the RAM 81 is zeroed, as are the input latches 65–68, during the initialization portion of the program to prepare for receiving new columns of vertical imaging data bits from the data processor 41, in this example. After the initialization portion of the program, the print loop is entered, wherein at every vertical column throughout the line of print, new imaging data bits are externally latched and then written into the RAM 81 from the latches 65–68 as directed by an input address pointer $P_i$, while data in the RAM 81 is read out from the RAM memory banks 87–90 as directed by an output address pointer $P_o$. The output data bits are sequentially latched into the buffer output latches 93–100. Thereafter, in response to a fire signal being applied to the drive pulse generator 102 from the data processor, the latched data bits within the buffer output latches 93–100 are transferred into the final output latch 101. Also at this time, the drive pulse generated by the drive pulse generator 102 enables the final output latch stage 101 to output its data bits as control signals for operating the print element drivers 53.

The program memory ROM 73 is addressed by the microprocessor 77 via the address lines included in bus 75, while the program instructions and information are transferred over data lines included in bus 75. The slant control program is contained in less than 500 bytes of the ROM memory 73.

The memory 81 as previously mentioned is a random access memory known in the art as a RAM. The RAM 81 is a stack of byte oriented random access memory that can be written into, as well as read from. It should be noted that while all addressing of the RAM 81 is via the microprocessor 77, the data lines 83–86 and 91 are not accessable by it. The input data to the RAM 81 comes from an external source, such as the data processor 41 of the present example, while the RAM 81 stored data bits are ultimately delivered to operate the print element drivers 53. In other words, the microprocessor 77 manipulates the addressing of imaging data bits within the RAM 81, but at no time has access to the actual contents of the RAM 81.

Each vertical column of data bits at a given address of the RAM 81 contain at least the same number of bits as there are print elements, as previously mentioned. Typically the top bit corresponds to the top print element on the slant print head 39, the next bit down the column corresponds to the second print element on the head 39, and so forth.

The number of columns of memory data bits required (length of row) in the imaging data RAM 81 is determined by the horizontal resolution H of the overall imaging system, multiplied by the distance from the first to the last print element, in the horizontal. For example, if the horizontal resolution H of the matrix printer system 37 is chosen to be 500 columns per inch, and the distance from the first to the last print element on the slanted print element on the slanted print head 39 is two inches, translated to the horizontal, then by simply multiplication the memory capacity required for the RAM 81 would be 1000 columns. If the slanted print head 39 includes 32 print elements, then 32 rows of memory are required along with 1000 columns for maintaining the required horizontal resolution, the product of which equals 32,000 bits of memory requirement for the RAM 81, in this example. Once the capacity of the RAM 81 is determined using the previously mentioned criteria, the actual printed line can be of any length, in that the addressing scheme simply wraps around the memory in a continuous manner.

In this example, four eight-bit input latches 65-68 are used for temporary storage of each vertical column of input imaging data bits received from the data processor 41. The imaging data bits are received by the latches 65-68 over a common eight-bit data bus 69, each byte of eight bits being latched sequentially via a decoded latch address into the latces 65-68. When the latches 65-68 are loaded, a full column of imaging data bits are then available for loading into the appropriate banks of memory 87-90 of RAM 81, each byte being input to a different column RAM address in a manner skewing each column from the other by a predetermined number of columns, as will be discussed in greater detail for the general case. Accordingly, this memory loading operation pre-skews the data bits so that they are partially ready for outputting.

In the example of the slant print head 39 having 32 print elements, a full column of data is then entered into the RAM 81 in four writes of eight bits each. The data is read out in eight accesses or reads of four-bits each for loading the buffer output latches 93-100. Accordingly, 12 RAM accesses per column are required. This novel scheme of reading out from the RAM 81 enables a substantial savings in processing time when compared to single bit maipulation with four input writes and 32 output reads, or vice versa.

The data bits are pre-skewed on input to RAM 81 so that each eight-bit data byte is aligned on an individual and different column address. Assume that the column segments 103-106 shown in RAM 81 in memory banks 87-90, respectively, are the pre-skewed column segments of imaging data bits of a previously inputted vertical column of imaging data bits. Assume further that the print head has traveled to a position where the lead or number 1 or first print element is to be operated in accordance with the "1" or "0" digital condition of the first data bit or top data bit contained in column segment 103. A "1" may mean "fire," and a "0" remain inoperative, for example. If this is true, then just prior to the print head reaching this column position, it is required that the top data bit of image data bit column 103 be previously loaded into the output latch 93. Similarly, for this particular column address position of column segment 103, the top bit of each column segment located at that column address in memory banks 87-90 must have just previously been loaded into output latch 93. That is, the top bit of each column byte of memory segments 87-90 contains the imaging data corresponding to the first, nineth, seventeenth, and twenty-fifth print elements of the print head 39. Just prior to the lead print element reaching the column position corresponding to the address of column segment 103, the second buffer output latch 94 must be loaded with the imaging data bits corresponding to the control signals required for operating the second, tenth, eighteenth, and twenty-sixth print elements of the slant print head 39 at the time it reaches the analogous column address position for column segment 13. To accomplish this loading, the second four-bit output latch 94 is loaded by moving an output address pointer $P_o$ from the address of column segment 103 to another address decremented therefrom by the number of columns I between two adjacent print elements, whereby the data bits corresponding to the second, tenth, eighteenth, and twenty-sixth printing elements in memory banks 87-90, respectively, are loaded into output latch 94. This process of decrementing the output pointer $P_o$ by I, continues until the imaging data bits required for controlling the 32 print elements of print head 39 have been loaded into the output latches 93-100, thereby providing the control signals to the final output latch 101 for operating the print head 39 print the imaging data under the head at the time that the lead print element reaches the column address position corresponding to the address of column segment 103. Appropriate interconnection of the buffer output latches 93-100 to the RAM data lines 91 and a decoded latching enable signal provide for the four-bit at a time loading of output latches 93-100, as previously described. This method of loading completes the skewing of the image data bits for operating the slanted print head 39.

The final output latch 101 includes a plurality of tri-state latches. These latches are simultaneously clocked in response to a fire signal from the data processor 41, and function to hold the state of the outputted imaging data bits throughout the pulse time of the imaging or drive pulse generated by drive pulse generator 102. This double latching of the output data is necessary to allow the processing and set up of the next column of vertical imaging input data bits to proceed while simultaneously finishing the printing of the current column of imaging output data bits.

The drive pulse generator 102 is responsive to a "fire signal" from the data processor 41 for providing the pulse timing required for operating the print element drivers 53. Typically, the drive pulse generated by pulse generator 102 is either a single or double pulse, depending upon the application.

The control and decode logic network 71 includes decoding gates to steer the input data bits, provides address write pulses for writing data bits into RAM 81, provides address decoded output latch signals for operating the output latches 93-100, includes two status flip-flops, and additional buffering circuitry. The logic network 71 will be described in greater detail with reference to FIG. 7.

With reference to FIG. 7, for the example previously given of operating with a 32 jet slanted print head 39, the vertical-to-slant data converter 51 can be provided by the logic network shown. In this embodiment of the invention, the data converter 51 includes connected as shown inverters 107-118 and 127, 128, AND gates 119-126, NAND gates 225-228, flip-flops 129, 130, 139, and 141, OR gates 131-133, the drive pulse generator 102 which, in this example, is a oneshot multi-vibrator (the design of this generator and the width of the jet enable output pulse JE, and other characteristics of this pulse are dependent upon the characteristics of the firing signal required for the particular print elements), a four-line to ten-line decoder 135, an octal buffer 137, and a four megahertz crystal oscillator 143, all of which with the exception of the drive pulse generator 102 are included in the control and decode logic 71 shown in FIG. 5. With further reference to FIGS. 5 and 7, the input latches 65 through 68 are directly equivalent therebetween, the random access memory 81 has its four banks of memory provided by RAM packs 187 through 190, the output latches 93–100 are provided by four integrated circuit packs 144–147, the final output latch 101 is provided by the four integrated circuit packs 148–151, the microprocessor 77 is provided by a single integrated circuit 77, and the function of the ROM 73 is provided by integrated circuit 152. The immediately following Table 1 shows the actual part numbers used for each one of the items referenced in FIG. 7, and includes the manufacturer's name for the particular integrated circuit, as well as the name of the manufacturer. It should be noted that this table is included only for the purpose of complete disclosure, and is not meant to be limiting, in that other types of integrated circuits and other manufacturer's components can be utilized for providing the required functions of the data converter 51.

position where the print elements thereof reach the next print column, respectively. The fire signal is strobed into the data converter 51 via AND Gate 124. Accordingly, the input latch, initialization, and fire signals are each gated into the converter 51 via the external strobe signal applied to inverter 127.

Two status signals are provided by the converter 51 as output signals to the data processor 41, in this example. One status signal is the "Initialization Complete" which is generated by the slant logic upon completion of zeroing RAMS 187–190, the logic providing this signal being AND Gate 126 and flip-flop 130. The other status signal is known as "Data Received" and is outputted on every column after the vertical column input data bytes then being inputted to the system have all been written into the RAM memory banks 87–90.

The microprocessor 77 generates control signals $A_1$-

TABLE I

| PARTS LIST FOR LOGIC NETWORK OF FIG. 7 | | | |
|---|---|---|---|
| Reference No. | Part No. | Name | Manufacturer |
| 65–68, 148–151 | 74LS2374 | Octal D-Type Flip-Flop | Texas Instruments (TI), Dallas, TX |
| 187–190 | 8114 | 8 Kilobit Static RAM | TI |
| 144–147 | 74116 | Dual-4-bit Latch | TI |
| 77 | Z80A | 8-Bit Microprocessor | Zilog, Campbell, CA |
| 152 | 2516 | PROM | TI |
| 119–126 | 74LS08 | Quad 2-Input Positive And Gate | TI |
| 225–228 | 74LS00 | Quad 2-Input Positive NAND Gate | TI |
| 107–114 | 74L04 | Hex Inverter | TI |
| 135 | 74LS42 | 4-Line-To-10-Line | TI |
| 131–133 | 74LS32 | Quad 2-Input Positive OR Gate | TI |
| 129, 130 139, 141 | 74LS74 | Dual D-Type Flip-Flops | TI |
| 137 | 74LS244 | Octal Buffer | TI |
| 115–118 127, 128 | 74LS04 | Hex Inverter | TI |

From Table 1, a PROM is shown for use in providing the function of the ROM 73 of FIG. 5. The reason the present invention chose to use a PROM instead of a ROM was to facilitate his prototyping of his invention, by permitting him to change the programming for his microprocessor 77 as required until the final program was established. It is expected that production units of the present invention will include the ROM 73 and not a PROM, in order to prevent accidental alteration of the program required for operating the microprocessor 77.

The vertical column input imaging data bits are supplied to the input latches 65–68 via an eight-bit data bus from the data processor 41, with the data bus being connected in parallel with the input terminals of each one of the latches 65–68. The data is entered in byte (8-bit) format and latched into the latches 65–68 via clock signals from AND gates 119–122, respectively. The AND gates 119–122 are enabled individually in a sequential manner via control signals "Latch 1 through Latch 4," respectively, from the data processor 41 for permitting the appropriate imaging byte to be latched into the appropriate one of the latches 65–68.

AND Gate 123 is responsive to the coincidence of a strobe signal applied to inverter 127 and a "Start of Line" signal each from data processor 41, for outputting an initialization signal at the beginning of each line of print. This initialization signal is inverted by inverter 128 and applied to the microprocessor 77. The "Fire" signal is received from the data processor 41 at substantially the same time that the print head 39 is moved to a $1-A_{14}$, for application to NAND gates 225–228, respectively, and a not write signal $\overline{WR}$ for application to inverter 116, the output of which is a write signal WR applied in common to the other input terminals of NAND Gates 225–228, for producing as output signals therefrom the signals $\overline{WR1}-\overline{WR4}$ for application to input latches 65–68 to enable these latches for read out, and via inverters 107–114 to produce as output signals $\overline{WRD1}-\overline{WRD4}$ for application to RAM memory banks 187–190 for enabling the same for writing data therein at a time slightly delayed from the time of enabling the input latches 65–68.

The microprocessor 77 is further operative for producing control signals $A_{11}-A_{13}$ for application to the 4-to-10 line decoder 135, the latter providing as output signals $L_1-L_8$ for application to the output latches 144–147, for controlling the latching thereof.

The final stage tri-stage output latches 148–151 are clocked via the "Fire" signal received as an output signal from AND gate 124, and are enabled by the drive pulse "JE" by the drive pulse generator 102.

The OR gate 131 receives signals $\overline{RD}$ and $\overline{A15}$ for operating the decoder 135. Also, the octal buffer 137 receives signals from the data processor 41 shown as signal "DIR" indicating the direction of movement of the print head 39, a signal "SA" indicating whether a shift operation is required for skewing a character to the right from the vertical, and a fire flag signal "FRFLG" from the pulse width generator 102. It operates to gate these signals into the microprocessor 77 via the data bus 161 of the latter. Note that data bus 161 of microprocessor 77 is also coupled to the ROM 152. The other logic elements shown in FIG. 7 are used for purposes of signal conditioning.

As previously mentioned, the apparatus and method of the present invention can be extended for use with a slanted print head consisting of any practical number of print elements linearly arranged on a slant relative to a horizontal plane. Accordingly, with reference to FIGS. 8 and 9, the generalized application of the preferred embodiment of the invention follows. For the sake of discussion let I, as defined in equation 3, be an integer representing the number of columns between any two adjacent printing elements as dictated by the chosen horizontal resolution H for the system. Also, let L be the number of memory banks available in the memory 81, where in the preferred embodiment, L also represents the number of input latches. (However, note that there are other alternatives for providing the input latching function other than equating the number of individual input latches to the number of memory banks.) Let J be the number of print elements linearly arranged on a slant on print head 39. Let Q be equal to the number of output latches, where in the preferred embodiment $Q=J/L$. Also, let $P_i$ and $P_o$ be the input and output pointers, respectively, for memory 81. Let the memory 81 be divided into individual memory banks $B_1, B_2, B_3, \ldots$ to $B_L$. Lastly, let each one of the output latches be designated $Q_1, Q_2, Q_3 \ldots$ to $Q_n$ for the nth output latch.

Figure 8:
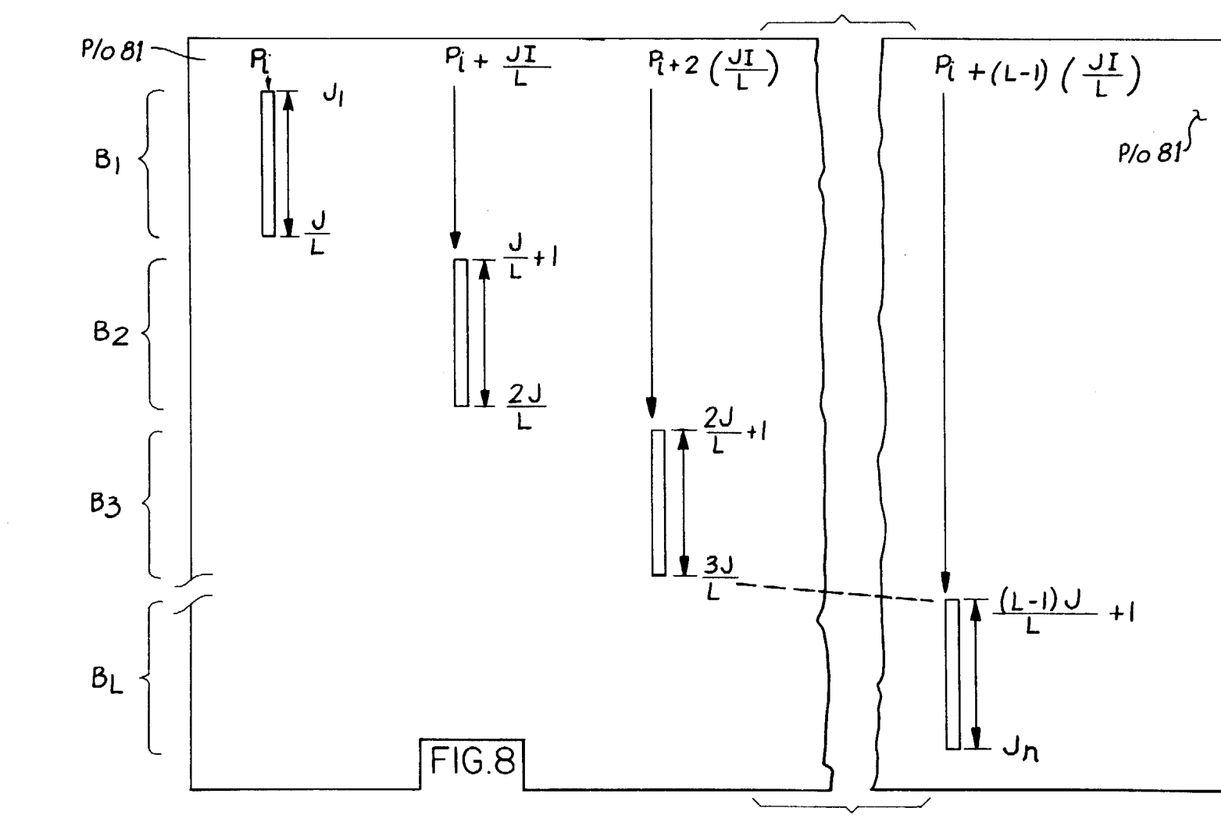
FIG. 8 shows the generalized method for loading a vertical column of imaging input data bits into memory for the preferred embodiment of the invention.
Figure 9:
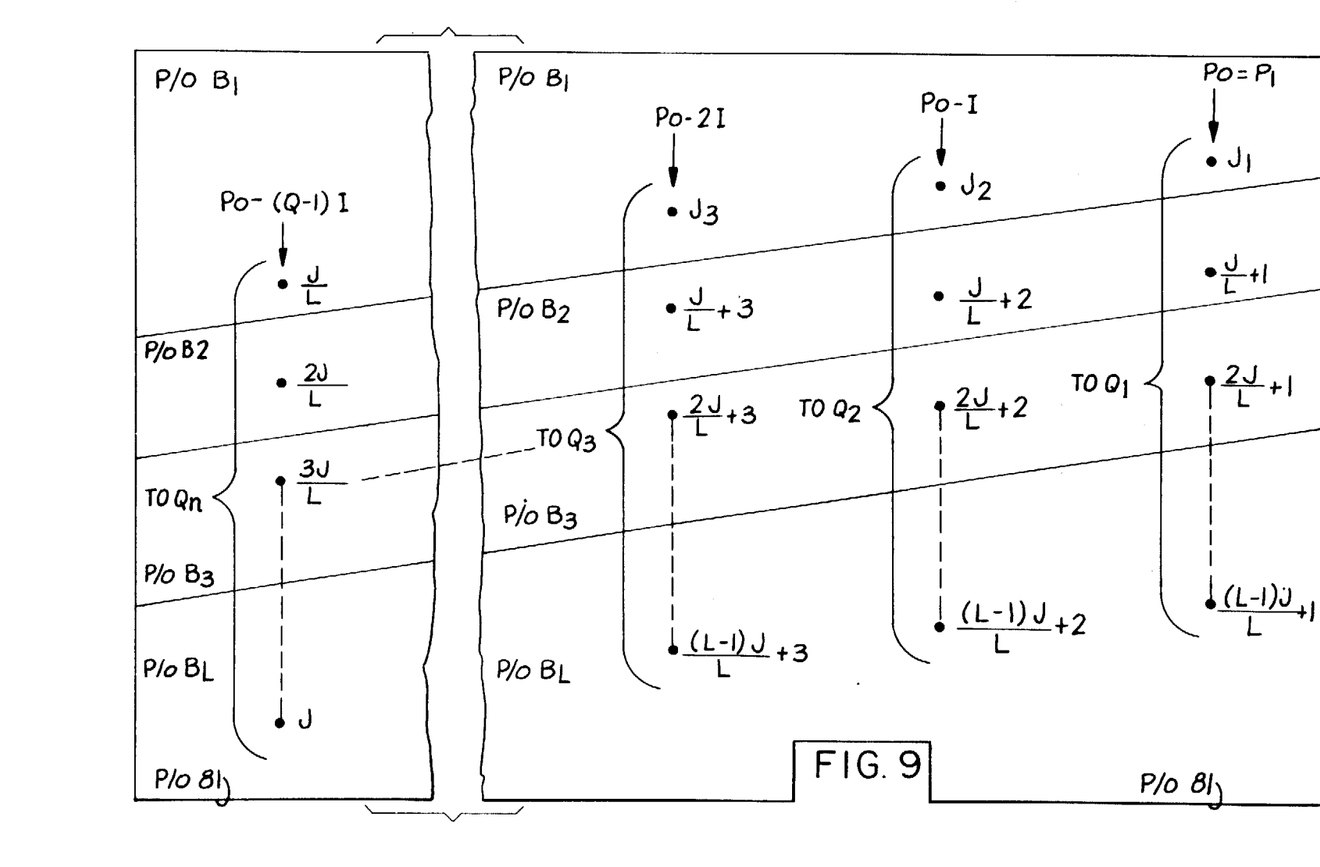
FIG. 9 shows the generalized method of the preferred embodiment of the invention for outputting imaging data bits from memory.

With reference to FIG. 8, at the initiation of a line of print, the first vertical column of imaging input data bits is divided into column portions or segments each equivalent to a byte having a number of bits equal to J/L. The input pointer $P_i$ is moved to the first memory address, and the top most portion of the column of imaging data bits corresponding to control signals for the first or lead print element $J_1$ through the succeeding J/L print elements of the print head 39 are written into memory bank $B_1$ at the initial address. In successive order, the next column portion containing the imaging data bit corresponding to print elements $J/L+1$ through $2J/L$ is inputted or written into memory bank $B_2$ at memory address location, $P_i+JI/L$; the third column portion or segment of imaging data bits is written into bank $B_3$ at memory address location $P_i+2(JI)/L$, this third column portion containing the data bits corresponding to print elements $2J/L+1$ through $3J/L$; the writing into the memory 81 continuing in this manner for the various column segments or bytes of the initial column if imaging data bits until the last byte is written into memory 81 at address location $P_i+[(L-1)(JI)/L]$, the last column portion containing the imaging data bits corresponding to the print elements $\{[(L-1)J/L]+1\}$ through $J_n$, the latter being the last print element on the print head 39. During the next full cycle of writing imaging data bits into memory, the input pointer $P_i$ is incremented by one to the next occurring memory address from the previous column portion written into memory bank $B_1$, and the previously mentioned writing processes is repeated. In this manner, successive columns of vertical column imaging data bits are successively written into memory. Note that for the writing operation just described, and for the outputting operation to be next described, it is assumed for the purpose of discussion that the print head 39 is moving from left-to-right relative to the horizontal plane of the print medium. Note that this method for writing the columns of imaging data bits into memory automatically preskews the imaging data bits, as previously mentioned.

The skewing of the imaging data bits is completed via the method of outputting the bits from memory into the output latches $Q_1$ through $Q_n$. This method is pictorially shown in FIG. 9. The first readout from memory 81 after initiating a new line of print consists of moving the output pointer $P_o$ to the memory address position first addressed by the input pointer $P_i$ at the initiation of the line of print, for beginning the process for writing imaging data into memory 81. For the column of imaging data bits located in memory banks $B_1$ through $B_L$ at this initial readout memory address, the top bits of each column segment are read out in order into a first output latch $Q_1$. In other words, as shown, these first imaging data bits for readout are the bits corresponding to the print elements $J_1$ (the first or lead element), $J/L+1$, $2J/L+1$, through $[(L-1)J/L+1]$. The output pointer is then moved by $-I$ columns to a new memory address position $(P_o-I)$ and the second occurring imaging data bits in each column segment located at that address are loaded into the second output latch $Q_2$. As shown, these imaging data bits are equivalent to print elements $J_2$, $J/L+2$, $2J/L+2$, through to the second occurring imaging data bit in the last column segment portion in the last memory bank $B_L$, the imaging data bit being designated generally as corresponding to the print element $[(L-1)J/L+2]$. Similarly, for loading appropriate imaging data bits into the third output latch $Q_3$, the memory address is changed by -I columns to $(P_o-2I)$, where the third occurring imaging data bits from the top of each column portion located at that address are loaded into latch $Q_3$. These imaging data bits correspond, as shown, to print elements $J_3$, $J/L+3$, $2J/L+3$, and so forth, to the imaging data bit corresponding to print element $[(L-1)J/L+3]$ of the last column segment located in memory bank $B_L$. This process of reading from memory into the output latch is continued as shown until the last data bits of each column portion are loaded into output latch $Q_n$ from memory address location $[P_o-(Q-1)I]$. These last occurring imaging data bits of the columns at this last address correspond to the print elements $J/L$, $2J/L$, $3J/L$, through to print element J, the last occurring print element on the print head. Note that although the preferred embodiment of the invention has been shown for reading data out from memory into a plurality of output latches equal in number to the number of print elements J on the print head 39 divided by the number of memory banks L being utilized. There are many other alternatives for so assembling the imaging data bits as they are read out from memory for obtaining the control signals for operating the print head during a given print cycle. All that is necessary is that the imaging data bits be read out from memory using the read out process shown in FIG. 9, in order to complete the required skewing of the individual imaging data bits. In normal operation of the present invention, the imaging information will be printed out having a vertical orientation identical to that called for by the originally inputted vertical columns of imaging data bits. However, as previously mentioned in describing the logic schematic of FIG. 5, it is possible to provide italics by causing the image data to skew to the right for example, whenever the "SR" signal is applied to the octal buffer 137, which causes the data bits to be shifted a desired amount to obtain the desired skewing.

As indicated above, for the example of printing from left-to-right, the input pointer $P_i$ is incremented once for each new column of imaging data bits to be written into memory, and the output pointer $P_o$ initially equals the input pointer $P_i$. Also, when printing from left-to-right, the input pointer $P_i$ is incremented by one for each successive vertical column of imaging data bits inputted to memory, as is the output pointer $P_o$. In other words, for each new cycle of printing, the input and output pointers $P_i$ and $P_o$, respectively, are incremented by one.

However, when printing from right-to-left, the data processor 41 must input the imaging data bits in reverse column order; the input and output pointers $P_i$, $P_o$, respectively, are each decremented by one; and the output pointer $P_o$ is not equal to the input pointer $P_i$, as shown below in equation (4):

$$P_o = P_i + I(J-1) \tag{4}$$

Note that for each cycle of printing the input pointer $P_i$ returns back to a base memory address position. When the print head 39 moves into printing position, the position encoder 63 signals are sensed by the data processor 41 for initiating the generation of firing signals. Note that if the print head is driven at a constant velocity, then a simple timing circuit could be used in place of the position encoder 63 for obtaining the signals representing the column position at any given time. The position encoder 63 may also include means for providing positional information to the motor controller 55 of FIG. 4.

Although particular embodiments of the invention have been shown and described, other embodiments and modifications will occur to those of ordinary skill in the art which will fall within the true spirit and scope of the invention as set forth in the appended claims.

I claim:

1. In a matrix printer including a print head consisting of J print elements linearly arranged on a slant relative to a horizontal plane, an electronic system for processing vertical columns of imaging data bits inputted from a data processor to produce control signals for operating said print head, for printing a desired image on a print medium in the same vertical orientation as said inputted image data, during times of relative movement between said print head and print medium, comprising:

controller means programmed for controlling the operation of said electronic system;

input memory means responsive to said controller means initialized at the beginning of each line of print, and operable for receiving and storing said columns of imaging data bits in equal distribution between L banks of said memory means, wherein each bank stores a different 1/L column portion of each one of said vertical columns of imaging data bits, the related L columns in said banks of memory being skewed from one another by the equivalent of the number of columns of print capability I times J/L, thereby pre-skewing or partially skewing said imaging data;

output memory means responsive to said controller means for completing or fully skewing said image data by making Q successive fetches from said input memory means during each cycle of printing, where Q=J/L, and where on a first fetch the first bits of each one of said L different preskewed columns of data bits in said L banks of said input memory means, respectively, that form the full column of data bits at the appropriate fetched memory address from said input memory means, are written into a first portion of said output memory means, on a second fetch decrementing by I from the initial input memory means address of said first fetch, for writing into a second portion of said output memory means immediately following said first portion, the second bits of each one of said L column segments of data at said decremented address, respectively, followed by decrementing by 2I from the initial input memory means address for fetching the third bits of each column or byte of data at this decremented address, respectively, and writing these third bits into a third portion adjacent said second portion of said output memory means, and continuing in an iterative manner until Q fetches and (Q−1) decrements have been made, where Q=J/L, for writing into said output memory means the successive data bits required, for providing the necessary control signals for printing the portions of image data columns under the print head at that given time.

2. The matrix printer of claim 1, wherein said controller means includes a microprocessor.

3. The matrix printer of claim 1, wherein said input memory means includes:

input latch means operable for receiving a vertical column of imaging data bits during each printing cycle;

random access memory (RAM) means, said RAM including said L banks of memory;

said controller means being programmed for operating said input latch means and said RAM for transferring said vertical column segments of imaging data bits into said RAM.

4. The matrix printer of claim 3, wherein said input latch means includes first through Lth input latches, each being associated with first through Lth banks of said RAM, respectively, and each being operable by said controller means for transferring each 1/Lth column or bits portion of a vertical column of imaging data bits into the related memory bank of said RAM, respectively.

5. The matrix printer of claims 1, or 4, wherein said output memory means further includes means responsive to a "fire signal" for providing the fully-skewed bits of said vertical column imaging data forming said control signals for operating said printer during a present print cycle, while concurrently permitting another column of imaging data bits to be written into said input memory means, and the next required column of control signals to be set up.

6. The matrix printer of claim 5, wherein said output memory means further includes:

a plurality of output latch means operable for being loaded with said first through J/Lth bits, respectively, of said L different preskewed columns of data bits as previously indicated, for assembling said control signals for firing or operating said print head at a given time.

7. The matrix printer of claim 6, wherein said means for permitting outputting of said control signals concurrent with writing another column of imaging data bits into said input memory means, and setting up another column of control signals, includes tri-state latch means operable for successively being loaded with said control signals or bits from said output latch means, and then disconnected from said output latch means while holding said control signals for outputting in response to said fire signal.

8. The matrix printer of claim 7, wherein said tri-state latch means includes a plurality of L tri-state latches, which are operable for simultaneous clocking at the time of said firing pulse for maintaining the state of and outputting said control signals for the time required to initiate and complete the firing of selected ones of said print elements.

9. In a matrix printer including a print head consisting of a plurality of J print elements linearly arranged on a slant relative to a horizontal plane, controller means for controlling the operation of said printer, and a memory, a method for processing vertical column imaging input data bits from a data processor to produce control signals for operating said print elements of said print head, for printing a desired line of images on a print medium in the same vertical orientation of said input data bits, during times of relative horizontal movement between said print head and print medium, comprising the steps of:

(a) dividing said memory into a plurality of first through Lth memory banks;

(b) allocating each one of J successive bits at each memory address as corresponding to successive ones of said J print elements, respectively, said bits forming a column at least J bits long, a 1/L portion of said column of bits being located in each one of said L memory banks, respectively;

(c) zeroing or resetting said memory prior to starting a new line of printing;

(d) selecting an initial memory address $P_i$;

(e) pre-skewing the first vertical column imaging input data bits by dividing the successive bits of the first vertical column data for printing into L successive groups or bytes, beginning with the byte from the end of the column including the lead bit corresponding to the leading print element of the print head relative to its direction of movement with respect to the print medium, writing the first byte into the column of the first bank of the memory at a memory address $P_i$, the successively occurring second byte into the second bank at memory address $(P_i+JI/L)$, where I is an integer representing the number of columns projected to the horizontal that can be printed between print elements (I=XH, where X is the horizontal projection of the distance between orifices, and H is the chosen horizontal resolution), the successively occurring third byte in the third bank at memory address $(P_i+2JI/L)$, continuing in this manner for writing the fourth through Lth bytes into successive ones of the L memory banks at addresses skewed from one another by JI/L, respectively, the Lth byte being written into the Lth bank at memory address $[P_i+(L-1)(JI/L)]$;

(f) pre-skewing the second vertical column imaging input data in the same manner as in step (e) for the first vertical column data, except that the initial memory address is incremented by 1, whereby $P_i$ goes to $P_{i+1}$;

(g) pre-skewing the third and remaining successively following vertical columns of imaging input data bits for the line to be printed by incrementing the memory address by 1 for each new column of data to be written into memory, respectively, and proceeding to write into memory each of said vertical data columns as in step (e);

(h) completing the necessary skewing of said first vertical column imaging input data bits by reading out from said memory a column of control signals having J/L groups of successive bits, the first group having the first occurring bits of each partial column of bits stored in said memory banks at memory address $(P_i-I)$, respectively, the third group having the third occurring bits of each partial column stored in said memory banks at memory address $(P_i-2I)$, respectively, continuing in this manner to the last group including the last bits of each partial column of bits stored in said memory banks at memory address $[P_i-(J/L-1)I]$, the resulting column of imaging data read out from memory representing the fully skewed data bits or control signals for operating said print head to print portions of the J columns then under the print head; and (i) completing the skewing of second and following vertical column imaging input data bits by incrementing by 1 the last initial memory address for each new readout operation or cycle of printing, and then proceeding as in step (h) for obtaining the second and following columns of control signals, respectively, for each cycle of printing.

10. The matrix pointer of claim 9, further including output latch means and tri-state latch means, the method further including the steps of:

(h) reading out individually each one of said columns of control signals from said memory into said output latch means; and (k) transferring said columns of control signals from said output latch means to said tri-state latch means, for permitting said matrix printer to continue writing vertical column data into said memory, simultaneous with completing the last initiated printing cycle controlled by the last assembled control signals, and the re-loading of said output latches with the completely skewed vertical column data bits for providing the next required set of control signals in advance of the next printing cycle.

11. The matrix printer of claim 10 further including a plurality of L input latch means, said method further including prior to step (e), the steps of:

(l) loading into each one of said L input latch means a 1/L portion of said vertical column imaging data bits, respectively; and (m) transferring said vertical column imaging data bits from said plurality of L input latch means into a corresponding one of said L memory banks in the manner indicated in step (e).

12. The matrix printer of claim 11, wherein the method further includes for printing while moving the print head in the opposite direction, the following steps:

receiving the vertical column data bits in reverse order relative to printing a line by moving said print head in the former direction;

decrementing by 1 (instead of incrementing) from the initial memory address for each new column of vertical imaging input data bits in steps (e) through (g);

initiating the outputting of data in step (h) from said memory from an initial memory address of $[P_i+I(J-1)]$; and decrementing by 1 (instead of incrementing) for each new readout operation of step (i).

13. The matrix printer of claim 12, wherein the method further includes the step of programming a controller to control said memory, plurality of L input latch means, output latch means, and tri-state latch means.

14. In a matrix printer including a print head consisting of J print elements linearly arranged in a slant relative to a horizontal plane, an electronic system for processing vertical column input imaging data bits from a data processor to produce control signals for operating said print elements of said print head, for printing a desired image on a print medium in the vertical orientation of said input data bits, during times of relative horizontal movement between said print head and print medium, comprising:

controller means programmed for controlling the operation of said electronic system;

memory means connected to said controller means, for storing said imaging data bits, said controller means controlling the addressing for both storage and access of said imaging data bits stored within said memory means;

a plurality of input latch means of number L, for storing a full column of imaging data bits, wherein each input latch means stores a different 1/L portion of the column of imaging data bits, L being an integer number greater than 1;

responsive to said controller means, said memory means including L banks of memory, whereupon said input latch means are loaded with a full column of imaging data bits, said memory means receives the data bits from said L input latch means in said L banks of memory, respectively, at L different column positions of said memory banks that are skewed from one another by the equivalent of the number of columns of print capability IJ/L, whereby successive vertical columns of input imaging data bits comprising a line of image data to be printed are successively loaded into said memory means at successively incremented addresses of said memory means;

a plurality of output latch means numbering Q, where Q=J/L, said memory means and said output latch means, responsive to said controller means for loading into a first one of said output latch means the first bits of each one of said L different skewed columns or bytes of data, respectively, stored within said memory means, beginning at the initial column position or address of writing into said L banks of said second memory, representing the beginning of a lien of print, for decrementing from the initial column position by I columns (where I=XH, X being the horizontal projected distance between two adjacent print elements, H being the chosen horizontal resolution, typically in columns per inch), and loading into a second one of said output latch means the second bits of each one of said L columns of data of said L memory banks, respectively, decrementing by 2I from the initial column position for reading out the third bits of each column or byte of data, respectively, of said L banks of said second memory at this last decremented position, and successively continuing to decrement and load (Q−1) times in this manner, until all of said Q output latch means are loaded; and tri-state output latch means responsive to said controller means for receiving from said Q output latch means data previously loaded into said Q output latch means, respectively, for providing control signals for operating said print element, while permitting said electronic system to receive the next column of vertical data from said data processor while completing the present printing cycle, said electronic system being operated in a repetitive manner for printing out successive columns of imaging data for each line of imaging data to be printed.

15. The matrix printer of claim 14, wherein said controller means includes:

a microprocessor; and another memory means for storing a slant control program fetchable by said microprocessor for obtaining operating instructions therefor.

16. The matrix printer of claim 14, wherein said another memory consists of a read-only-memory (ROM).

17. The matrix printer of claim 14, wherein said memory means includes a random-access-memory (RAM).

18. In a matrix printer including a print head consisting of J print elements linearly arranged on a slant relative to a horizontal plane, an electronic system for processing vertical columns of image data bits to produce control signals for operating said print elements of said print head for printing a desired line of images on a print medium during times of relative horizontal movement therebetween, comprising:

a read-only-memory (ROM) for storing a slant control program;

a microprocessor connected to said ROM via a data and address bus for fetching instructions contained in said slant control program;

a random-access-memory (RAM) connected to said microprocessor via address lines, said microprocessor controlling the addressing of imaging data bits within said RAM;

an input data bus for receiving said vertical columns of image data bits from an external source representing a columnar portion of an image to be printed;

a plurality of L input latches connected between said input data bus and a plurality of input terminals of said RAM, wherein L is an integer number, said latches storing a full column of imaging data bits, wherein each input latch stores a different 1/L portion of the column of imaging data bits;

said RAM including L banks of memory, whereupon said input latches being loaded with a full column of imaging data bits, said input latches and said RAM are responsive to said microprocessor for writing into said RAM the data from said L input latches into said L banks of memory, respectively, at different column positions of said memory banks that are skewed from one another by JI/L, I being equivalent to the number of columns of print capability of said matrix printer between any two adjacent ones of said slanted print elements projected onto a horizontal plane, respectively, thereby preskewing said image data bits;

a plurality of first through Jth/L output latches, said RAM and said output latches, responsive to said microprocessor, for loading into said first output latch the first bits of each byte or partial column of image data bits in said L banks of memory of said RAM at the initial column position of writing into said banks of memory, for decrementing from the initial column position by I, and loading into said second output latch the second bits of each byte of said first through Lth memory banks, respectively, again decrementing by 1 to the next column position of said RAM for reading out the third bits of each byte of said first through Lth banks of memory into said third output latch, and continuing in this manner until all of said output latches are loaded, thereby completing the skewing of the image data bits loaded therein; and tri-state latch means, responsive to said microprocessor, for receiving the data loaded into said first through J/L output latches, respectively, for providing control signals for operating said print elements, while permitting said electronic system to receive another column of vertical image data bits, and assemble another column of fully skewed image data bits in said output latches, while completing the present printing cycle, said electronic system being so operated in a repetitive manner for first pre-skewing portions of successively received columns of image data bits, and then completing the skewing of image data bits by outputting columns of selected ones of said image data bits representing control signals necessary for operating said J printing elements for printing out portions of the image data under the head at a given print position.

* * * * *